United States Patent
Greenfield

(10) Patent No.: US 9,084,008 B1
(45) Date of Patent: Jul. 14, 2015

(54) FLEXIBLE VIDEO-ON-DEMAND VIEWING PERIOD

(71) Applicant: CSC Holdings, LLC, Bethpage, NY (US)

(72) Inventor: Jonathan Greenfield, Miller Place, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 14/247,661

(22) Filed: Apr. 8, 2014

Related U.S. Application Data

(63) Continuation of application No. 13/162,171, filed on Jun. 16, 2011, now Pat. No. 8,719,853.

(51) Int. Cl.
| | |
|---|---|
| *H04H 60/33* | (2008.01) |
| *H04N 21/4335* | (2011.01) |
| *H04N 21/8355* | (2011.01) |
| *H04N 21/472* | (2011.01) |
| *H04N 21/442* | (2011.01) |

(52) U.S. Cl.
CPC ..... *H04N 21/4335* (2013.01); *H04N 21/44222* (2013.01); *H04N 21/47202* (2013.01); *H04N 21/8355* (2013.01)

(58) Field of Classification Search
USPC .......................................... 725/9, 14, 86–87
See application file for complete search history.

(56) References Cited

U.S. PATENT DOCUMENTS

| | | | |
|---|---|---|---|
| 7,885,517 B2* | 2/2011 | Blackketter et al. | 386/296 |
| 8,201,204 B2* | 6/2012 | Connery et al. | 725/87 |
| 2007/0079342 A1* | 4/2007 | Ellis et al. | 725/89 |
| 2007/0094690 A1 | 4/2007 | Rodriguez et al. | |
| 2009/0178093 A1 | 7/2009 | Mitsuji et al. | |
| 2009/0282372 A1 | 11/2009 | Jerding et al. | |
| 2011/0107365 A1 | 5/2011 | Chen et al. | |
| 2011/0251995 A1* | 10/2011 | Hangartner et al. | 707/621 |
| 2012/0301104 A1* | 11/2012 | Dove | 386/239 |
| 2012/0324489 A1 | 12/2012 | Greenfield | |

* cited by examiner

*Primary Examiner* — Mulugeta Mengesha
(74) *Attorney, Agent, or Firm* — Sterne, Kessler, Goldstein & Fox PLLC

(57) ABSTRACT

A flexible video-on-demand viewing period is varied depending on whether the customer has completed viewing the entire program, allowing the viewing period to be extended if the customer has not completed viewing the entire program. The approach better assures the customer that they will have the opportunity to complete viewing the entire program, compared to a fixed rental period, while assuring program copyright owners that the utility of the rental is limited, fundamentally as intended, preserving the future value of the asset. The approach also enables viewers to retain bookmarks as needed for content that is not naturally tied to a rental period, such as subscription video-on-demand, without unnecessarily enlarging their list of active rentals.

18 Claims, 3 Drawing Sheets

FLEXIBLE VIDEO-ON-DEMAND VIEWING PERIOD

This application is a continuation of U.S. application Ser. No. 13/162,171, filed on Jun. 16, 2011, now U.S. Pat. No. 8,719,853, which is incorporated herein by reference in its entirety.

BACKGROUND OF THE INVENTION

1. Field of the Invention

Embodiments relate generally to viewing an on-demand video and more particularly to a flexible viewing periods for the on-demand video rental.

2. Background Art

Home video rentals of movies have traditionally been offered with fixed rental periods. This began with rentals of movies on videotape, where retention of the videotape by one customer meant that the rental merchant could not rent the same videotape to another customer. For roughly the first two decades of the home video rental industry, rental on a nightly basis was the dominant business model.

As video-on-demand rentals of movies became available, the rental of a movie to one customer no longer prevented the video-on-demand service provider from renting the same movie to other customers. However, the fixed rental period model was already well-established in the minds of both consumers and movie studios, and consequently, fixed movie rental periods were adopted for early video-on-demand systems. These systems typically implemented rental periods of twenty-four to forty-eight hours. For example, the early DIVX rental system enabled a forty-eight-hour rental period of forty-eight hours beginning at first playback. Cable systems typically implement a twenty-four hour rental period, beginning at the time of order.

For simplicity and convenience of implementation, cable systems have typically also implemented a twenty-four rental period for subscription video on demand orders. That is, when a subscriber orders an asset that is part of a subscription package, a twenty-four hour viewing window is typically imposed, despite the fact that there is no transactional charge for the order, and the user is free to re-order the asset, at no additional cost, so long as the asset remains available as part of the subscription package. Therefore, the user need not complete viewing the asset within the twenty-four hour period. The need to re-order creates two disadvantages, however. The user must again navigate through the user interface to locate the asset for re-order (as opposed to finding it directly in an "active rentals" list), and upon re-ordering, the user will have lost any bookmark allowing playback to be restarted where it last ended.

Since the advent of video-on-demand, there have been significant changes in the movie rental market. In particular, NetFlix's subscription DVD mail-order rental service significantly changed the rental model, by effectively eliminating late charges and allowing subscribers to retain a rented DVD as long as they wish. In response, local retail movie rental businesses extended typical rental periods to as much as two weeks without late charges.

Consequently, the twenty-four hour rental periods still typically used by cable operators (and required by movie studios) has become increasingly unattractive to consumers.

Accordingly, what is needed is a new, more flexible viewing period for video-on-demand that will satisfy the movie studios' fundamental desire that movie rentals reflect a very limited duration access to the rented product, while simultaneously satisfying the consumer's desire for flexibility in viewing and confidence that, once they have paid for a movie, they will be able to complete watching the entire movie at their convenience.

Furthermore, what is also needed is a viewing period for subscription assets that will maintain easy access, and retain any established bookmarks, so long as the asset remains available, and the user has not yet completed viewing the asset.

SUMMARY OF THE INVENTION

The invention discloses systems and methods for implementing a flexible video-on-demand (VOD) viewing period. In an embodiment, there remains a maximum rental period, measured from either the time an asset is ordered or from the time playback first begins. In another embodiment, the invention implements a post-completion maximum viewing period. In another embodiment, the invention implements a constructive completion.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Figure 1:
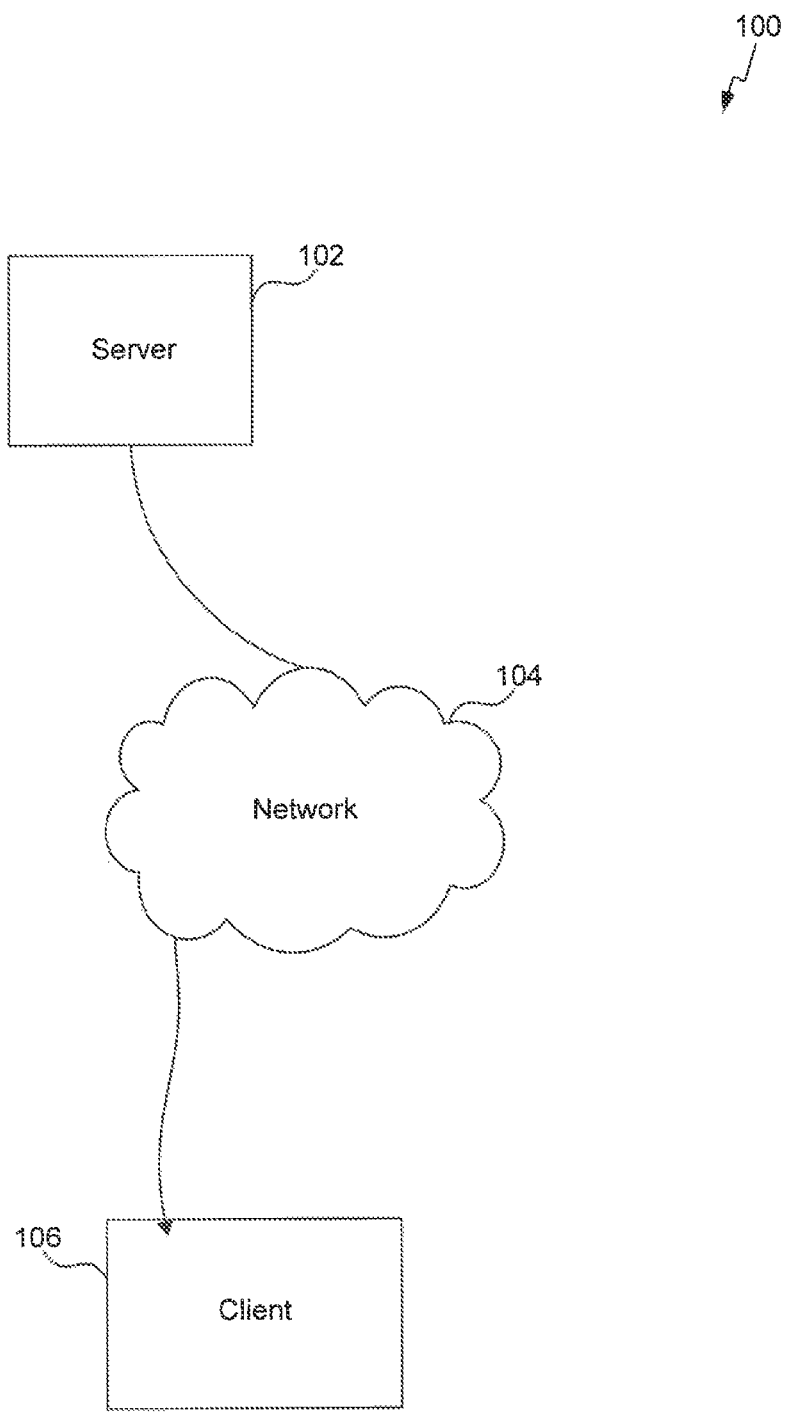
FIG. 1 is a block diagram of architecture of a network content delivery system.

FIG. 1 illustrates a block diagram of architecture of a network content delivery system 100, including a server 102, a network 104, and a client 106. Client 106 is an electronic device capable of communicating and exchanging content with server 102 over network 104. Exemplary client 106 devices are a set-top-boxes (STBs), Internet Protocol (IP)-based (i.e., IPTV) STBs, personal computers, laptops, tablets mobile devices, and other devices that would be apparent to those skilled in the art.

Content delivery system 100 includes server 102 that receives media content (e.g., an on demand video or a video stream) provided by content providers. The media is typically received via satellite or terrestrial feed in digital form, and server 102 is configured to deliver media content, including video, to client 106. In an embodiment, server 102 may be connected to a head-end that processes and distributes media content to multiple STBs.

The invention discloses systems and methods for implementing a flexible video-on-demand (VOD) viewing period to the user once a video is ordered. In an embodiment, the invention may specify a maximum rental period, measured from either the time the video is ordered or from the time playback first begins. For example, the maximum rental period is set to be seven days from the time an asset is ordered. Regardless of all other rules for controlling the length of the rental period, the asset will no longer be available for viewing by the customer (without an additional order) seven days after the initial order.

In addition to the maximum rental period, the invention defines a post-completion maximum viewing period. The purpose of the post-completion viewing period is to recognize when the user has effectively completed viewing the asset. In an embodiment, the post-completion viewing period begins when user playback reaches the end of the ordered asset. For example, in an embodiment, once the user reaches the end of the asset, the system begins tracking a twenty-four hour post-completion maximum viewing period. If the embodiment also implements a seven day maximum rental period, upon reaching the end of the asset, the viewer will continue to have access to the asset until the earlier of twenty-four hours later, or seven days from the time of the initial order. In an alternate embodiment, the view will continue to have access to the asset until the longer of the twenty-four hour period from the time of the initial order or seven days In an embodiment, the system 100 may implement a notion of constructive completion, intended to recognize when an asset has been substantially viewed, and to limit the ability of users to game the system 100, for example, by terminating playback just before the asset ends. Accordingly, system 100 may deem the asset substantially viewed when playback reaches a defined point prior to the end of the asset, such as five minutes before the end of the asset, or at a specific content-specific point, such as the point corresponding to the end of the story and the beginning of the closing credits. In such an embodiment, system 100 begins tracking the post-completion maximum viewing period once playback reaches the defined point. To facilitate effective recognition of such constructive completion, system 100 may use a global parameter to control constructive completion, or it may extend the metadata normally used to describe assets and control their use with metadata identifying the constructive completion point for each asset, on an asset-by-asset basis. In an embodiment, system 100 may use both a global parameter and per-asset metadata that overrides the global data, when defined.

In another embodiment, constructive completion may be deemed to have occurred when total playback time has exceeded a specific amount of absolute time or a specific percentage of the total running time of the asset. For example, system 100 might deem an asset substantially viewed when total playback time reaches 150% of the total running time for the asset. In such a case, if a user orders a movie with a running time of 120 minutes, system 100 will deem the asset substantially viewed once playback time reaches 180 minutes. This definition of constructive completion prevents a user from playing back an asset almost to the end, rewinding to (or restarting from) the beginning, and then playing the asset back repeatedly, without triggering system 100 to begin tracking the post-completion maximum viewing period.

As with the prior embodiment, system 100 may use a global parameter, extend existing metadata on a per-asset basis, or both, to define the total playback time before constructive completion is deemed to have occurred, for the various assets available in system 100.

In yet another embodiment, system 100 may both define a constructive completion point prior to the actual end of the asset and a total playback time, and deem constructive completion to have occurred once either measure is reached.

In an alternative embodiment, the maximum rental period is treated as infinite, and the rental period is limited only based on actual viewing activities. (Actual availability is never actually infinite, being affected by other factors such as windows of availability of assets to the service provider, and maintenance of a subscription or other customer relationship with the viewer.) In particular, this embodiment may be used in conjunction with assets provided on subscription video-on-demand (SVOD) basis, and for which there is no transactional charge associated with ordering the asset.

In an embodiment, an ordered SVOD asset is retained as an active rental, available through the system's 100 user interface providing quick access to currently active rentals, while the asset remains available as part of the user's subscription package and until the user completes viewing of the asset. When the viewer completes viewing the asset, system 100 begins to track a post-completion maximum viewing period. During the entire period, from initial order to the end of the post-completion viewing period, the asset remains an active rental, and any user bookmarks associated with the asset are preserved. When the post-completion maximum viewing period ends, or when the asset becomes no longer available as part of the user's subscription, the asset is removed from the list of active rentals, and any user bookmarks are discarded.

In another embodiment, system 100 implements a constructive completion mechanism, in order to facilitate a timely cleanup of assets the user is done with, but which have not been played through to the end of the asset (because, for example, the user was not interested in viewing the closing credits, and terminated playback prior to the actual end of the asset).

In an embodiment, the SVOD system may implement a maximum rental period, to assure timely cleanup of assets the user decided were not sufficiently interesting to continue watching, prior to completion. The system may additionally provide a manual control for the user to directly remove an asset from the active rentals list.

Although the exemplary embodiment relates to video-on-demand content, as will be evident to those skilled in the relevant arts, the invention is not limited to video content, but may also be used to manage access for any on-demand content rented on a transactional or subscription basis, by monitoring for the completion of consumption or the substantial consumption of that content, including but not limited to, video games, audio assets such as musical recordings or audio books, and written content, such as e-books.

Moreover, system 100 may monitor the completion of consumption or the substantial consumption of the content on server 102 or client 104.

In a related application of the invention to a digital video recorder (DVR), the DVR system may track completion of playback, or constructive completion of playback, of recordings, in order to prioritize the deletion of recordings when recording space becomes constrained. For example, the DVR system may track which assets have been completed, and which have not, and adjust existing algorithms to select assets for deletion to prioritize the preservation of assets that have not been completed. In an embodiment, the system may allow a user to mark specific assets to be preserved regardless of the completion status. As those skilled in the relevant arts will recognize, the DVR may be implemented as a conventional in-home DVR or as a network or remote-storage DVR, located at a service provider facility, such as a cable television head-end, and the invention may be applied to management of storage of any media asset, including but not limited to, video games, audio assets such as musical recordings or audio books, and written content, such as e-books. In addition, the same storage management technique may be used to manage the storage of any device storing media assets, such as personal computers, smartphones, tablets, portable media players, video game systems, and e-book readers.

Figure 2:
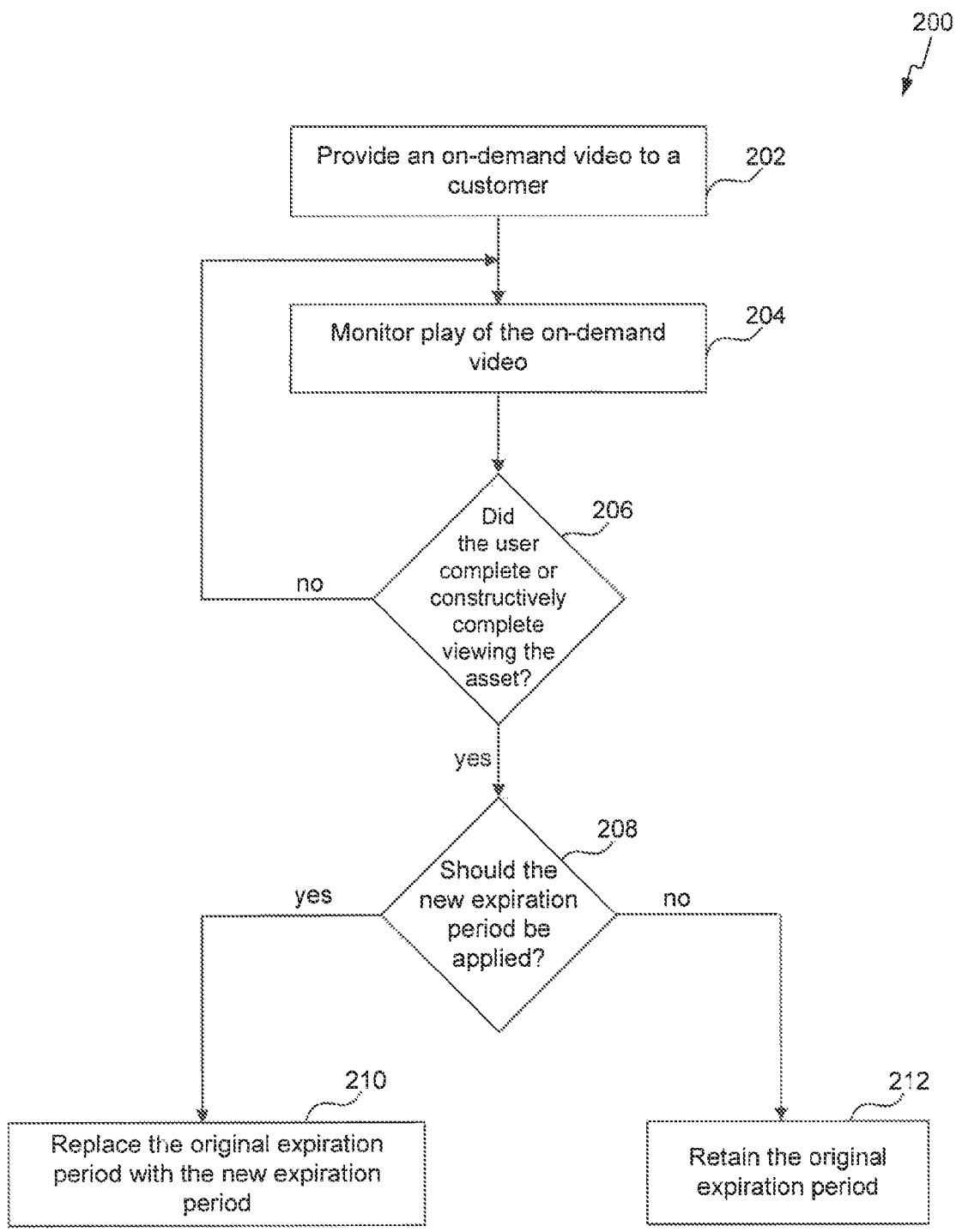
FIG. 2 is an example flowchart of a method of providing a flexible, on-demand viewing period.

FIG. 2 is an example flowchart 200 for providing a flexible VOD viewing period, according to an embodiment.

Flowchart 200 begins at step 202, during which the VOD is ordered. For example, a user may order the VOD by connecting to client 106. In response, server 102 provides the VOD through client 106 for a user to view.

At step 204, the play of the asset is monitored. In an embodiment, the viewing period begins when the VOD is ordered. In another embodiment, the viewing period begins when the user first begins playout of the asset. Once the viewing period begins, system 100 monitors playout of the asset. In an embodiment, once the user reaches the end of the asset, the system begins tracking a twenty-four hour post-completion maximum viewing period. In another embodiment, system 100 monitors for constructive completion, for example, playback through a defined point prior to the end of the asset. In another embodiment, constructive completion may be deemed to have occurred when the total playback time has exceeded a specific amount of absolute time or a specific percentage of the total running time of the asset.

At stages 206-212 the rental period of the asset may be shortened. At stage 206, system 100 determines whether the user completed or constructively completed viewing of the asset. If the completion or constructive completion occurred, the flowchart proceeds to step 208, otherwise to step 204.

At step 208, the system determines whether a new expiration period should be applied. For example, the system evaluates whether the post-completion maximum viewing period requires an earlier expiration that the maximum rental period allows. If so, the flowchart proceeds to step 210, otherwise to step 212.

At step 210, the original expiration time is replaced with a new expiration time. For example, the expiration time for the rental is advanced to conform to the required post-completion viewing period maximum, and the rental period is shortened.

At step, 212, the original expiration time is retained by the system.

Figure 3:
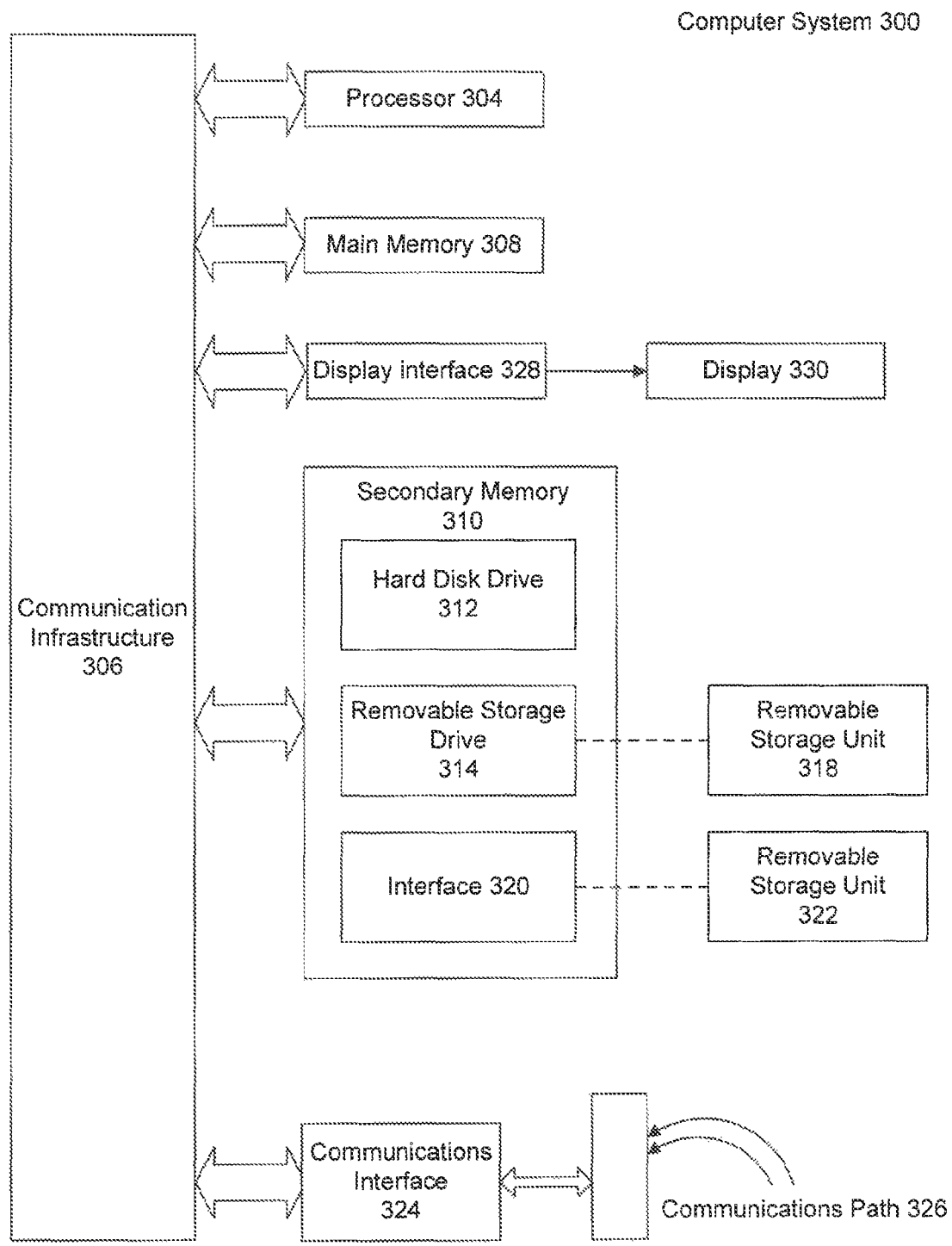
FIG. 3 is a block diagram of an exemplary computer system in which embodiments of the invention can be implemented.

FIG. 3 is a schematic diagram of an example computer system 300 used to implement embodiments of client 106 and/or server 102. Various aspects of the various embodiments can be implemented by software, firmware, hardware, or a combination thereof. Example computer system 300 in which an embodiment, or portions thereof, can also be implemented as computer-readable code. After reading this description, it will become apparent to a person skilled in the relevant art how to implement embodiments using other computer systems and/or computer architectures.

Computer system 300 includes one or more processors, such as processor 304. Processor 304 can be a special purpose or a general purpose processor. Processor 304 is connected to a communication infrastructure 306 (for example, a bus or network).

Computer system 300 also includes a main memory 308, preferably random access memory (RAM), and may also include a secondary memory 310. Secondary memory 310 may include, for example, a hard disk drive 312 and/or a removable storage drive 314. Removable storage drive 314 may comprise a floppy disk drive, a magnetic tape drive, an optical disk drive, a flash memory, or the like. The removable storage drive 314 reads from and/or writes to a removable storage unit 318 in a well-known manner. Removable storage unit 318 may comprise a floppy disk, magnetic tape, optical disk, etc. which is read by and written to by removable storage drive 314. As will be appreciated by persons skilled in the relevant art(s), removable storage unit 318 includes a tangible computer readable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from the removable storage unit 322 to computer system 300.

Computer system 300 may also include a communications interface 324. Communications interface 324 allows software and data to be transferred between computer system 300 and external devices. Communications interface 324 may include a modem, a network interface (e.g., an Ethernet card), a communications port, a PCMCIA slot and card, or the like. Software and data transferred via communications interface 324 are provided to communications interface 324 via a communications path 326. Communications path 326 may be implemented using wire or cable, fiber optics, a phone line, a cellular phone link, and radio frequency (RF) link or other communications channels.

In this document, the terms "computer program medium" and "computer usable medium" are used to generally refer to media such as removable storage unit 318, removable storage unit 322, and a hard disk installed in hard disk drive 312. Computer program medium and computer usable medium can also refer to memories, such as main memory 308 and secondary memory 310, which can be memory semiconductors (e.g. DRAMs, etc.). These computer program products are means for providing software to computer system 300.

Computer programs (also called computer control logic) are stored in main memory 308 and/or secondary memory 310. Computer programs may also be received via communications interface 324. Such computer programs, when executed, enable computer system 300 to implement embodiments as discussed herein, such as the system described above. In particular, the computer programs, when executed, enable processor 304 to implement the processes of embodiments. Accordingly, such computer programs represent controllers of the computer system 300. Where embodiments are implemented using software, the software may be stored in a computer program product and loaded into computer system 300 using removable storage drive 314, interface 320, hard drive 312 or communications interface 324.

Computer system 300 may also include a display interface 328 and a display 330. Display 330 allows for the viewing of content, such as, without limitation, VOD described herein. Display interface 228 receives content from communications infrastructure 306 and provides the content to display 300.

It is to be appreciated that the Detailed Description section, and not the Summary and Abstract sections, is intended to be used to interpret the claims. The Summary and Abstract sections may set forth one or more, but not, all exemplary embodiments of the present invention as contemplated by the inventor, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for ensuring available storage space on a media playing system, comprising:
    storing a media asset in the media playing system;
    monitoring play of the media asset; and
    prioritizing the media asset for deletion when the media asset has been consumed, wherein the media asset has been consumed when playback exceeds a percentage of a playing time of the media asset.

2. The method of claim 1, wherein monitoring the play of the media asset further comprises tracking completion of playback of the media asset.

3. The method of claim 1, wherein monitoring the play of the media asset further comprises tracking a constructive completion of playback of the media asset, wherein the constructive completion is a point in the media asset different from an end of the media asset.

4. The method of claim 1, further comprising:
    determining whether the media asset is marked for preservation; and
    wherein the prioritizing is further based on the determining.

5. The method of claim 1, wherein the media playing system is a digital video recorder (DVR).

6. The method of claim 1, wherein the DVR is a network DVR or a remote storage DVR.

7. The method of claim 1, wherein the media asset is on-demand media content.

8. A media playing system comprising:
    a memory that store a media asset; and
    a processor coupled to the memory and configured to:
        monitor play of the media asset; and
        prioritize the media asset for deletion when the media asset has been consumed, whereby the deletion ensures available storage space on the media playing system, wherein the media asset has been consumed when playback time exceeds a percentage of a playing time of the media asset.

9. The system of claim 8, wherein to monitor the play of the media asset the processor is further configured to track completion of a playback of the media asset.

10. The system of claim 8, wherein to monitor the play of the media asset the processor is further configured to track a constructive completion of a playback of the media asset, wherein the constructive completion is a point in the media asset different from an end of the media asset.

11. The system of claim 8, wherein the media asset includes metadata and to monitor the play of the media asset the processor is further configured to utilize the metadata.

12. The system of claim 8, wherein the processor is further configured to:
    determine whether, the media asset is marked for preservation and prioritize based on the determination.

13. The system of claim 8, wherein the media playing system is a digital video recorder (DVR).

14. The system of claim 8, wherein the DVR is a network DVR or remote storage DVR.

15. The system of claim 8, wherein the media asset is on-demand media content.

16. A non-transitory computer-readable medium having instructions stored thereon that, when executed by a computing device, cause the computing device to perform operations that ensure available storage space on a media playing system, comprising:
    storing a media asset in the media playing system;
    monitoring play of the media asset; and
    prioritizing the media asset for deletion if the media asset has been consumed, wherein the media asset has been consumed when the media asset has been viewed up to a defined point before an end of the media asset or when playback exceeds a percentage of a playing time of the media asset.

17. A method for ensuring available storage space on a media playing system, comprising:
    storing a media asset in the media playing system;
    monitoring play of the media asset; and
    prioritizing the media asset for deletion when the media asset has been consumed, wherein the media asset has been consumed when the media asset has been viewed up to a defined point before an end of the media asset.

18. A media playing system comprising:
    a memory that store a media asset; and
    a processor coupled to the memory and configured to:
        monitor play of the media asset; and
        prioritize the media asset for deletion when the media asset has been consumed, wherein the media asset has been consumed when the media asset has been viewed up to a defined point before an end of the media asset and whereby the deletion ensures available storage space on the media playing system.

* * * * *

UNITED STATES PATENT AND TRADEMARK OFFICE
CERTIFICATE OF CORRECTION

| | | |
|---|---|---|
| PATENT NO. | : 9,084,008 B1 | Page 1 of 1 |
| APPLICATION NO. | : 14/247661 | |
| DATED | : July 14, 2015 | |
| INVENTOR(S) | : Jonathan Greenfield | |

It is certified that error appears in the above-identified patent and that said Letters Patent is hereby corrected as shown below:

Claims

Column 7, Line 57, Claim 8. Please replace "memory that store" with --memory that stores--.

Column 8, Line 20, Claim 12. Please replace "whether, the media" with --whether the media--.

Column 8, Line 50, Claim 18. Please replace "memory that store" with --memory that stores--.

Signed and Sealed this
Sixteenth Day of February, 2016

Michelle K. Lee
*Director of the United States Patent and Trademark Office*